US009189092B2

(12) United States Patent
Xie et al.

(10) Patent No.: US 9,189,092 B2
(45) Date of Patent: Nov. 17, 2015

(54) TOUCH PANEL WITH ADDITIONAL GRAPHIC DISPLAY AREA

(75) Inventors: Yanjun Xie, Wuhan (CN); Yau-Chen Jiang, Zhubei (CN); Bin Lai, Fuzhou (CN); Limei Huang, Xiamen (CN)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 31 days.

(21) Appl. No.: 13/536,936

(22) Filed: Jun. 28, 2012

(65) Prior Publication Data
US 2013/0168215 A1 Jul. 4, 2013

(30) Foreign Application Priority Data

Dec. 31, 2011 (CN) .......................... 2011 1 0461220

(51) Int. Cl.
*H03K 17/975* (2006.01)
*G06F 3/041* (2006.01)

(52) U.S. Cl.
CPC ...... *G06F 3/041* (2013.01); *G06F 2203/04103* (2013.01)

(58) Field of Classification Search
USPC .................................. 200/600; 345/173, 174
See application file for complete search history.

(56) References Cited

U.S. PATENT DOCUMENTS

| 8,970,508 | B2 * | 3/2015 | An et al. | 345/173 |
| 9,052,757 | B2 * | 6/2015 | Kubo et al. | 1/1 |
| 2012/0103777 | A1 * | 5/2012 | Kang | 200/600 |
| 2013/0106727 | A1 * | 5/2013 | Juan et al. | 345/173 |
| 2014/0168545 | A1 * | 6/2014 | Han et al. | 349/12 |

FOREIGN PATENT DOCUMENTS

| CN | 201673481 U | 12/2010 |
| TW | M361675 U | 7/2009 |

* cited by examiner

*Primary Examiner* — Vanessa Girardi
(74) *Attorney, Agent, or Firm* — Gokalp Bayramoglu

(57) ABSTRACT

A touch panel comprises a transparent substrate and a non-transparent insulation layer disposed on the transparent substrate. The non-transparent insulation layer has a first opening, and a second opening corresponding to a graphic region. The touch panel further comprises transparent conductive patterns disposed in the first opening and the second opening, and non-transparent conductive patterns disposed on the non-transparent insulation layer outside of the graphic region. The non-transparent conductive patterns electrically connect the transparent conductive pattern in the second opening.

16 Claims, 6 Drawing Sheets

TOUCH PANEL WITH ADDITIONAL GRAPHIC DISPLAY AREA

BACKGROUND OF THE INVENTION

This Application claims the benefit of the People's Republic of China Application No. 201110461220.0, filed on Dec. 31, 2011.

FIELD OF THE INVENTION

The present disclosure relates to a touch panel and a method of manufacturing the same. More particularly, the present invention relates to a touch panel having a special graph region and a method of manufacturing the same.

DESCRIPTION OF THE RELATED ART

In the current market of consumer electronic products, integrating touch function into displays has become a main development trend for portable electronic products. Touch panels have been applied to various electronic products such as smart phones, mobile phones, tablets and laptops. When using a touch panel, a user can perform operations and give instructions directly through the objects displayed on the screen, thereby providing a humanized operation interface between the user and the electronic product.

At present, conventional touch technologies include resistive type, capacitive type, and acoustic wave type. A touch panel generally comprises a transparent touch region and a non-transparent peripheral region surrounding the touch region. The touch region is used to generate a touch sensing signal. A plurality of peripheral leads are disposed in the peripheral region to transmit a touch sensing signal to a signal processer for calculation of coordinates of the touch location.

For some designs, some transparent graphic regions may be designed in a peripheral region of a touch panel to show special patterns, such as a trademark, an icon, or other patterns, or used to dispose an IR module.

However, in the above design, the peripheral leads in the peripheral region pass through the graphic region. In consideration of manufacturing process, the peripheral leads in the peripheral region are usually made of a non-transparent conductive material such as silver, copper, etc. Thus, viewing from the front side of the touch panel, a user can see the peripheral leads exposed from the graphic region, thereby affecting visual effect of the appearance and possibly affecting presentation of the special patterns or function of the devices disposed subsequently in the graphic region.

SUMMARY OF THE INVENTION

In view of the above defects of the conventional technology, the present disclosure provides a touch panel and a method of manufacturing the same. In the present disclosure, a transparent conductive material is used to form part of the peripheral leads in graphic regions of a touch panel, thereby overcoming the defect of the peripheral leads in graphic regions being easily seen by a user in the conventional technology.

The present disclosure is to provide a touch panel. The touch panel comprises a transparent substrate, a non-transparent insulation layer disposed on the transparent substrate, wherein the non-transparent insulation layer has a first opening and a second opening exposing parts of the transparent substrate, transparent conductive patterns disposed on the exposed transparent substrate in the first opening and the second opening, and non-transparent conductive patterns disposed on the non-transparent insulation layer beyond the first opening and the second opening, wherein the non-transparent conductive patterns electrically connect the transparent conductive pattern in the first opening and the transparent conductive pattern in the second opening.

The present disclosure is to also provide a method of manufacturing a touch panel, wherein the method comprises the steps of: forming a non-transparent insulation layer having a first opening and a second opening on a transparent substrate to expose parts of the transparent substrate; forming transparent conductive patterns on the exposed transparent substrate in the first opening and the second opening; and forming non-transparent conductive patterns on the non-transparent insulation layer beyond the first opening and the second opening, wherein the non-transparent conductive patterns electrically connect the transparent conductive pattern in the first opening and the transparent conductive pattern in the second opening.

BRIEF DESCRIPTION OF THE DRAWINGS

For those skilled in the art to understand the present disclosure, numerous embodiments are described below, annexing drawings to minutely illustrate the matters of the disclosure and the purpose thereof.

DETAILED DESCRIPTION OF THE EMBODIMENTS

Figure 1:
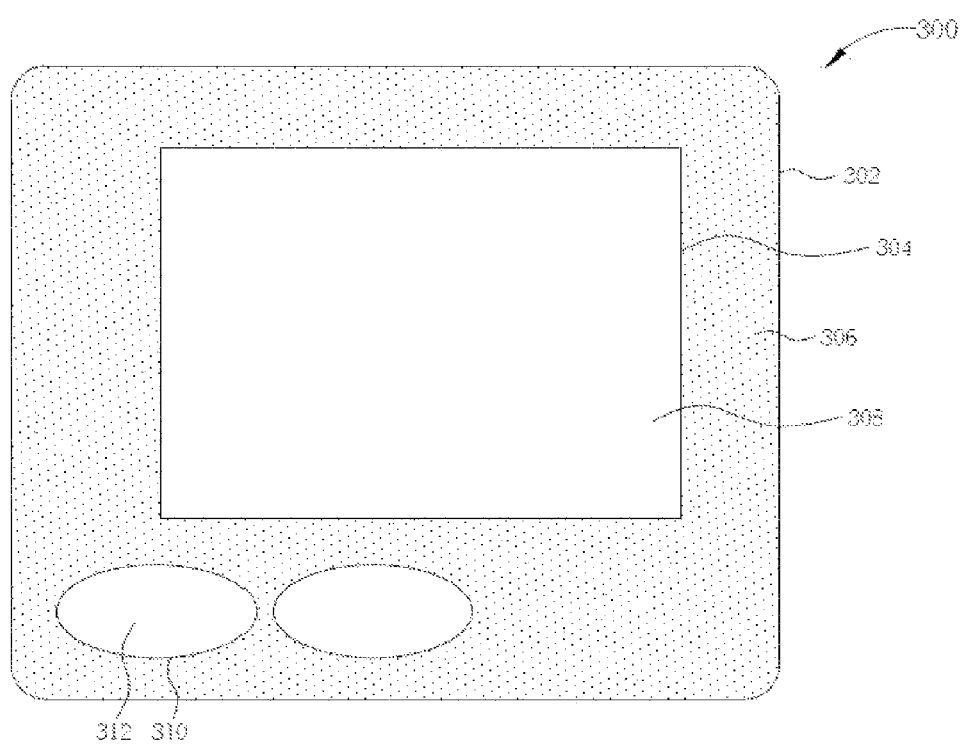
FIG. 1~FIG. 4 are top views of a process of manufacturing a touch panel in sequence in accordance with the present disclosure.

The process of manufacturing a touch panel is illustrated in sequence according to FIG. 1~FIG. 4. As shown in FIG. 1, a substrate 300 is firstly provided as a disposition base for conductive patterns inside a touch panel. The substrate 300 is a transparent cover which is made of, for example, transparent silica glass, polymethyl methacrylate (PMMA) or other materials, and is used to protect conductive circuits inside the touch panel and provide a touch surface (namely, outer surface of the substrate 300) for a user to perform touch operation by a finger or a stylus. Meanwhile, the substrate 300 enables image light emitted by a display module (such as a LCD display module) below the touch panel to pass through it, such that an image is presented in front of the user.

As shown in FIG. 1, a non-transparent insulation layer 302 is formed (for example, formed by printing) on a non-touch surface of the substrate 300 (namely, inner surface of the substrate). The non-transparent insulation layer 302 has a first opening 304 that delimits a non-transparent peripheral region 306 and a transparent display region 308 on the substrate 300. The transparent display region 308 is not covered by the non-transparent insulation layer 302 such that image light emitted from the inner surface can pass through it, thereby an image being presented in front of the user. The display region 308 is also a touch region of the touch panel, wherein transparent conductive sensing patterns are only disposed in the region.

Moreover, the non-transparent peripheral region 306 presents an outer frame model on the surface of the substrate 300, and it is a non-touch region. Other additional patterns can also be presented in the peripheral region 306 through design, thereby achieving more appearance changes of the touch panel. In an embodiment of the present disclosure, a plurality of transparent second openings 310 are formed on the non-transparent insulation layer 302 to delimit a peripheral region 306 and a graphic region 312 of the touch panel. Graphs to be presented on the panel, such as a trademark, an icon, etc., can be printed on the inner surface of the substrate 300 within the regions of the second openings 310. Alternatively, a camera, an IR module or other devices disposed inside the touch panel can also be exposed from the touch surface of the substrate through the second openings 310 so as to emit or receive light of a certain wavelength.

Figure 2:
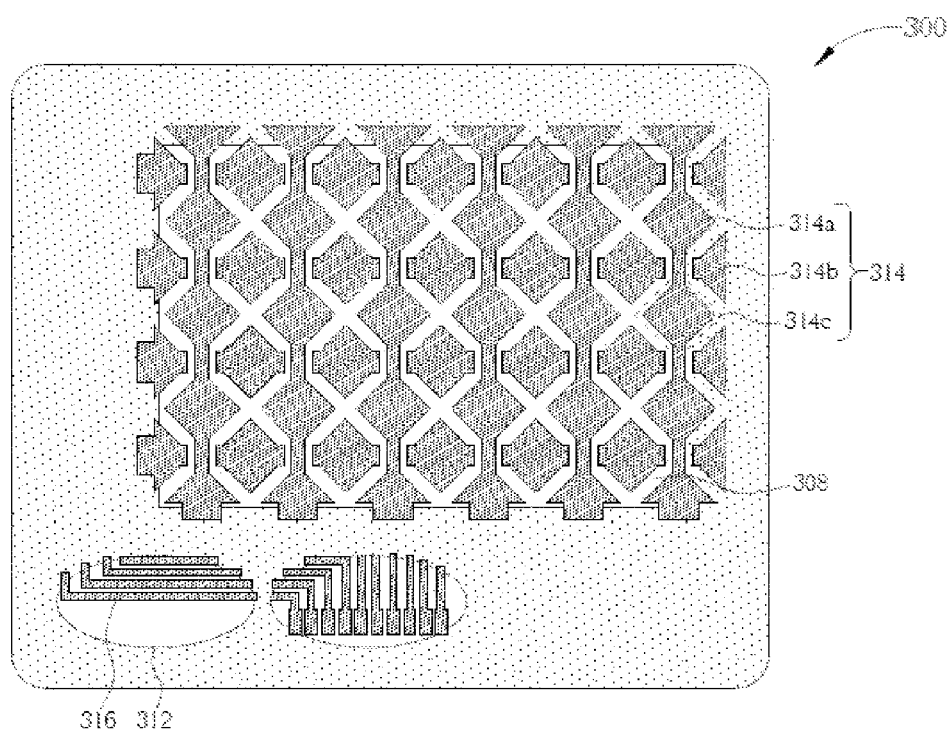

After completing the delimitation of the display region 308 and the peripheral region 306 on the substrate 300, formation of conductive patterns inside the touch panel is performed. In the present disclosure, the conductive patterns are classified into transparent conductive patterns and non-transparent conductive patterns. The transparent conductive patterns are disposed in areas not covered by the non-transparent insulation layer 302 on the substrate 300, wherein the areas comprise the display region 308 and the graphic region 312. In the present embodiment, the transparent conductive patterns comprise a transparent conductive sensing pattern 314 located in the display region 308 and a transparent conductive circuit pattern 316 located in the graphic region 312 of the peripheral region 306. As shown in FIG. 2, the transparent conductive sensing pattern 314 (as the dot area shown in the figure) is formed in the display region 308 corresponding to the touch region of the touch panel. The transparent conductive sensing pattern 314 can be capacitive sensing electrodes, comprising a plurality of vertical first sensing electrodes 314a and a plurality of horizontal second sensing electrodes 314b. Each first sensing electrode 314a and each second sensing electrode 314b both comprise a plurality of sensing units 314c, wherein the sensing units 314c are arranged into arrays on the substrate 300 and can sense a user's touch operation (such as sliding, clicking, etc.) on the surface of the substrate, thereby transforming it into a sensing signal.

Furthermore, the transparent conductive circuit pattern 316 is formed in the graphic region 312 of the substrate and is used to transmit the touch signal generated by the transparent conductive sensing pattern 314. It should be noted that the transparent conductive circuit pattern 316 does not yet electrically connect the transparent conductive sensing pattern 314 in the phase of formation. In order to not block image display in the display region, the transparent conductive sensing pattern 314 and the transparent conductive circuit pattern 316 are made of a transparent conductive material, such as ITO, IZO, etc. In the method of present disclosure, the transparent conductive sensing pattern 314 and the transparent conductive circuit pattern 316 can be formed simultaneously, for example, by printing the two patterns in the display region 308 and the graphic region 312 simultaneously by a same printing process, but it would be appreciated that other methods can also be incorporated. Order of forming the transparent conductive sensing pattern 314 and the transparent conductive circuit pattern 316 is changeable, for example, the transparent conductive sensing pattern 314 can be formed first, and then the transparent conductive circuit pattern 316 can be formed, or visa-versa.

Figure 3:
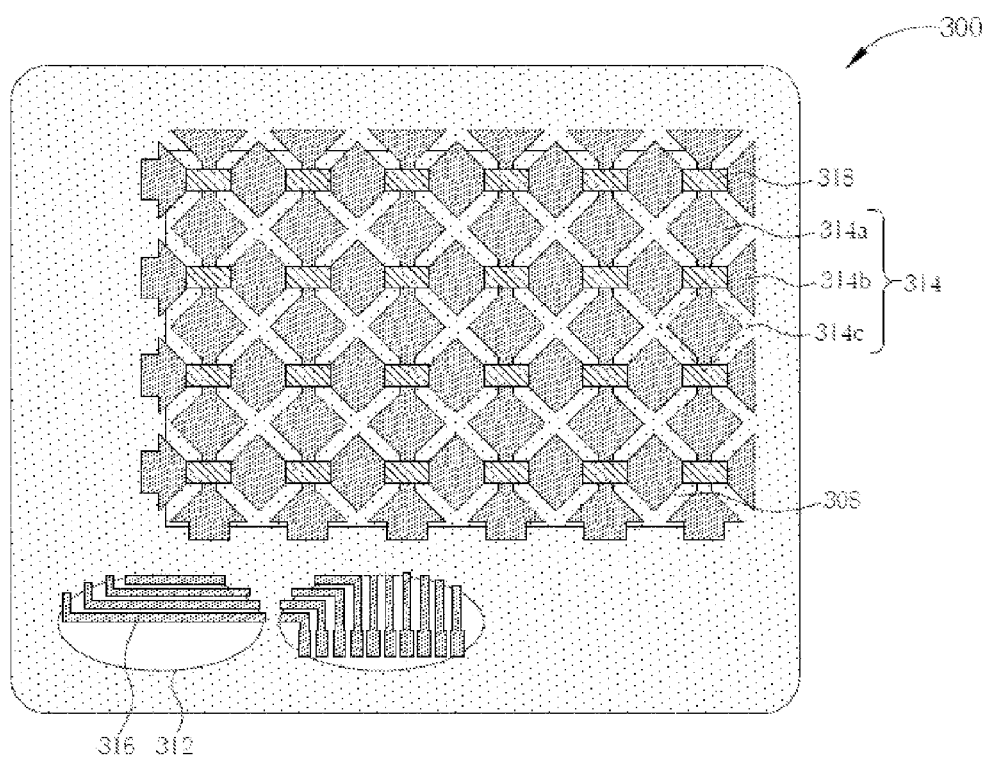

Referring to FIG. 3, after the transparent conductive sensing pattern 314 is formed, a plurality of insulation blocks 318 are further formed on the transparent conductive sensing pattern 314. The insulation blocks 318 are formed between the sensing units 314c of the horizontal second sensing electrodes 314b such that jumpers formed thereupon in the subsequent process are electrically insulated from the first sensing electrodes 314a. Details are described in the subsequent embodiment.

Figure 4:
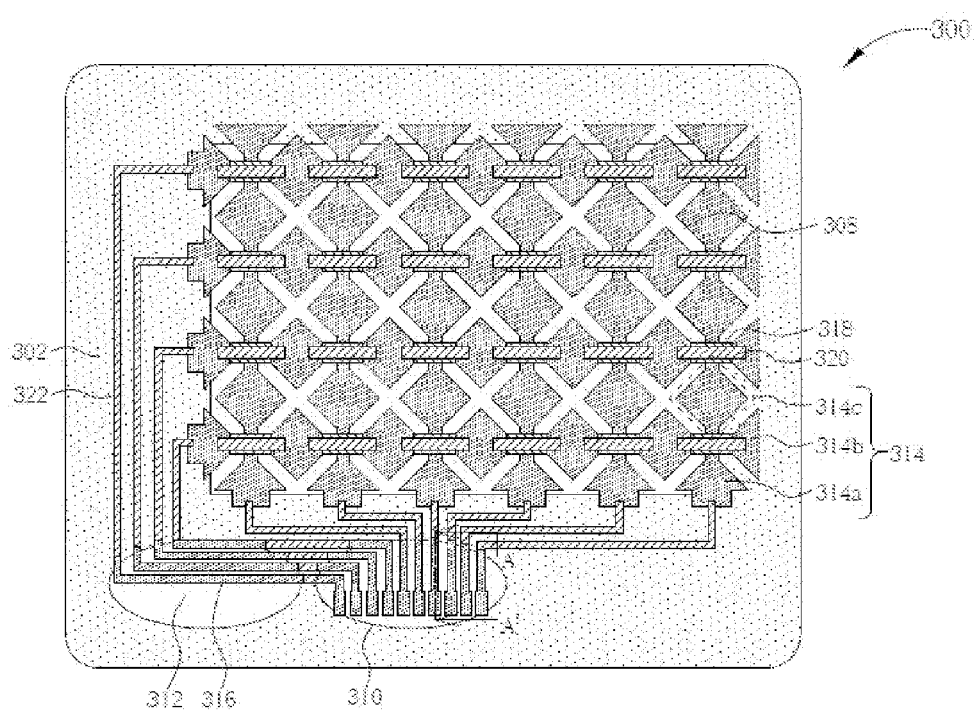

After the insulation blocks 318 are formed, formation of non-transparent conductive patterns is performed. As shown in FIG. 4, in the present embodiment, non-transparent conductive patterns are classified into non-transparent jumpers 320 located in the display region 308 and non-transparent conductive circuit pattern 322 located in the peripheral region 306. Each jumper 320 is formed on each insulation block 318 which is formed in the above step. The jumpers 320 electrically connect the sensing units 314c of the horizontal second sensing electrodes 314b respectively such that the horizontal second sensing electrodes 314b are serially connected into a complete sensing electrode. Thus, the insulation blocks 318 are disposed between the jumpers 320 of the second sensing electrodes 314b and the first sensing electrodes 314a such that the first sensing electrodes 314a are electrically insulated from the second sensing electrodes 314b, thereby both of the sensing signals not being mutually interfered.

Moreover, the non-transparent conductive circuit pattern 322 is formed on the non-transparent insulation layer 302 in the peripheral region 306. The non-transparent conductive circuit pattern 322 electrically connects the transparent conductive sensing pattern 314 in the display region 308 and the transparent conductive circuit pattern 316 in the graphic region 312 such that touch signals generated by the transparent conductive sensing pattern 314 can be transmitted to the separated transparent conductive circuit pattern 316. In the method of the present disclosure, the jumpers 320 and the non-transparent conductive circuit pattern 322 can be formed simultaneously, for example, by printing the two patterns in the display region 308 and on the non-transparent insulation layer 302 respectively by a same printing process, and the material can be silver paste, copper wire, etc.

After completing the formation of the transparent conductive patterns and the non-transparent conductive patterns, a special graphic layer (not shown), such as a trademark or an icon, can be additionally formed in the graphic region 312 on the substrate 300. The special graphic layer can be directly printed on the substrate 300 in the graphic region 312 and on the transparent conductive circuit pattern 316 from the inner surface of the substrate 300, thereby completing the manufacturing of the touch panel of the present disclosure. Viewing from the outer surface of the substrate 300, the user can see the special patterns exposed from the second openings 310. Furthermore, the conductive circuit pattern disposed in the graphic region 312 is transparent, thereby not affecting presentation of the special patterns, or similarly, not affecting the camera, IR module or other devices disposed inside the touch panel emitting or receiving light of a certain wavelength. Details for disposition of the special graphic layer are described in the subsequent embodiment.

In the present disclosure, the inner surface (namely, the surface having conductive patterns) of the substrate 300 of the completed touch panel is laminated to a display panel (not shown). Thus, the conductive patterns formed are covered by the substrate 300 and the display panel, thereby achieving a protection effect. The conductive circuit patterns on the substrate can be extended beyond the substrate and connected to a processing unit, such as an IC circuit board of a portable electronic device, to process the touch signals generated by the touch panel.

Figure 5:
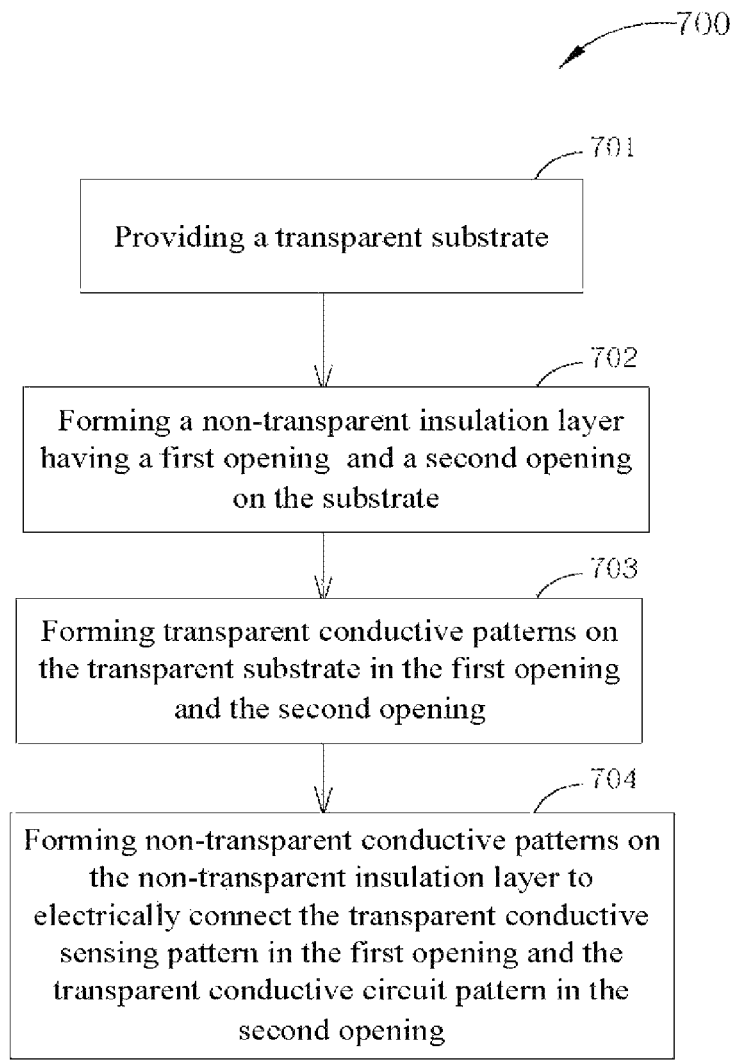
FIG. 5 is a flowchart of manufacturing the touch panel in accordance with the present disclosure.

Integrating with the above manufacturing steps, FIG. 5 summarizes a process 700 of manufacturing a touch panel in accordance with the present disclosure: firstly, in step 701, providing a transparent substrate; in step 702, forming a non-transparent insulation layer having a first opening (namely, a display region) and a second opening (namely, a graphic region in a peripheral region), wherein the first opening and the second opening expose parts of the transparent substrate; in step 703, forming transparent conductive patterns on the transparent substrate in the first opening and the second opening respectively, wherein the transparent conductive patterns comprise a transparent conductive sensing pattern and a transparent conductive circuit pattern; and then, in step 704, forming non-transparent conductive patterns on the non-transparent insulation layer in the peripheral region, wherein the non-transparent conductive patterns electrically connect the transparent conductive sensing pattern in the first opening and the transparent conductive circuit pattern in the second opening.

Figure 6:
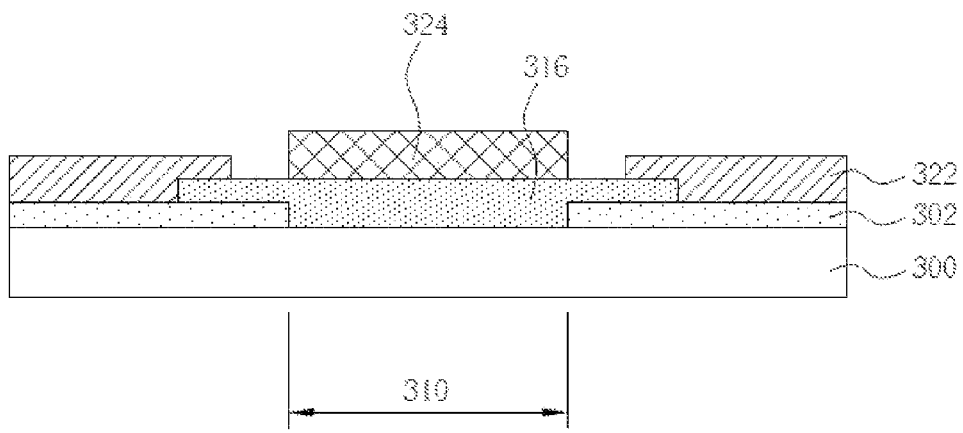
FIG. 6 is a schematic sectional view of a structure in a graphic region sectioned along the section line A-A' shown in FIG. 4.

According to the above process, the present disclosure further provides a touch panel structure. Referring to FIG. 6, it is a schematic sectional view of a structure in the graphic region 312 sectioned along the section line A-A' shown in FIG. 4. FIG. 6 only illustrates the elements in the graphic region 312 of touch panel. Due to the fact that the features and manufacturing methods of the elements in other regions of the touch panel are the same as the above embodiments and for the purpose of simplifying the figure, elements in other regions of the touch panel are not illustrated or described again herein. A touch panel of the present disclosure comprises: a transparent substrate 300 used as a disposition base for inner conductive patterns; a non-transparent insulation layer 302 disposed on the transparent substrate 300 having an opening 310 that exposes a part of the transparent substrate 300, wherein the opening 310 delimits a transparent area and a non-transparent area of the touch panel; a transparent conductive pattern 316 disposed on the exposed transparent substrate 300 in the opening 310, wherein a part of the transparent conductive pattern 316 is extended to the peripheral non-transparent insulation layer 302; a non-transparent conductive pattern 322 disposed on the non-transparent insulation layer 302 beyond the opening 310 and electrically connected to the transparent conductive pattern 316 that is extended to the non-transparent insulation layer 302, wherein the non-transparent conductive pattern 322 is a conductive circuit pattern that can transmit touch signals generated by the conductive sensing pattern; and a special graphic layer 324 disposed on the transparent conductive pattern 316 within the region of the opening 310, wherein the special graphic layer 324 comprises a trademark, an icon or other patterns and can be presented to a user from the outer surface of the substrate 300 through the transparent conductive pattern 316 and the opening 310.

While certain embodiments have been shown and described, various modifications and substitutions may be made thereto without departing from the spirit and scope of the disclosure. Therefore, it is to be understood that the present disclosure has been described by way of illustration and not limitations.

What is claimed is:

1. A touch panel, comprising:
    a transparent substrate;
    a non-transparent insulation layer disposed on the transparent substrate to define a display region and a peripheral region;
    a touch-sensing pattern disposed on the transparent substrate in the display region;
    at least one graphic portion formed on the peripheral region; and
    a plurality of peripheral leads disposed in the peripheral region, wherein each of the peripheral leads comprises at least one first section made of a non-transparent conductive material and at least one second section made of a transparent conductive material, and the first section is covered by the non-transparent insulation layer and the second section is disposed corresponding to the graphic portion so that the second section is exposed from the non-transparent insulation layer through the graphic portion.

2. The touch panel as claimed in claim 1, wherein the graphic portion includes two openings formed on the peripheral region.

3. The touch panel as claimed in claim 2, wherein the touch-sensing pattern in the display region comprises a plurality of first-axis sensing electrodes and a plurality of second-axis sensing electrodes.

4. The touch panel as claimed in claim 3, wherein the peripheral leads comprise a plurality of first-axis peripheral leads connected to the first-axis sensing electrodes and a plurality of second-axis peripheral leads connected to the second-axis sensing electrodes.

5. A touch panel, comprising:
    a transparent substrate;
    a non-transparent insulation layer disposed on the transparent substrate, wherein the non-transparent insulation layer has a first opening, and a second opening;
    a transparent conductive touch-sensing pattern disposed on the portion of the transparent substrate exposed through the first opening; and
    a plurality of peripheral leads disposed in a peripheral region, wherein each of the peripheral leads comprises a first section made of a non-transparent conductive material and a second section made of a transparent conductive material; and
    wherein the first section is covered by the non-transparent insulation layer, and the second section is disposed in the second opening so that the second section is exposed from the non-transparent insulation layer through the second opening.

6. The touch panel as claimed in claim 5, wherein the first opening delimits a display region on the touch panel.

7. The touch panel as claimed in claim 5, wherein the transparent conductive touch-sensing pattern disposed on the portion of the transparent substrate exposed through the first opening comprises a plurality of first-axis sensing electrodes and a plurality of second-axis sensing electrodes.

8. The touch panel as claimed in claim 5, wherein the second opening delimits a graphic region on the touch panel.

9. The touch panel as claimed in claim 5, wherein each of the peripheral leads comprising the first section and the second section in the second opening transmits touch signals generated by the transparent conductive touch-sensing pattern.

10. The touch panel as claimed in claim 5, further comprising a graphic layer disposed on the second section in the second opening.

11. The touch panel as claimed in claim 10, wherein the graphic layer comprises a trademark or an icon.

12. A method of manufacturing a touch panel, comprising the Mowing steps of:
    forming a non-transparent insulation layer having a first opening and a second opening on a transparent substrate, wherein the first opening defines a display region, the non-transparent insulation layer defines a peripheral region, and the second opening defines a graphic region in the peripheral region; and forming a touch-sensing pattern and a plurality of peripheral leads, wherein the step of forming the touch-sensing pattern and the peripheral leads comprises steps of:

forming the touch-sensing pattern in the display region and a plurality of second sections of the peripheral leads in the graphic region, wherein the touch-sensing pattern and the second sections of the peripheral leads are made of a transparent conductive material; and forming a plurality of first sections of the peripheral leads in a peripheral region, wherein the first sections of the peripheral leads are covered by the non-transparent insulation layer, and the second sections of the peripheral leads are exposed from the non-transparent insulation layer through the graphic region, wherein the first sections of the peripheral leads are made of a non-transparent conductive material.

13. The method of manufacturing the touch panel as claimed in claim 12, wherein the touch-sensing pattern in the display region and the second sections of the peripheral leads in the graphic region are formed simultaneously.

14. The method of manufacturing the touch panel as claimed in claim 12, further comprising forming a graphic layer on the second sections of the peripheral leads in the graphic region.

15. The method of manufacturing the touch panel as claimed in claim 12, wherein the touch-sensing pattern comprises a plurality of first-axis sensing electrodes and a plurality of second-axis sensing electrodes.

16. The method of manufacturing the touch panel as claimed in claim 12, wherein each of the peripheral leads comprising the first section and the second section in the graphic region transmits touch signals generated by the touch-sensing pattern.

* * * * *